(12) United States Patent
Keller

(10) Patent No.: US 7,382,955 B1
(45) Date of Patent: Jun. 3, 2008

(54) OPTICAL FIBER CABLE WITH SYSTEM AND METHOD FOR MID-SPAN ACCESS

(75) Inventor: David Keller, Cary, NC (US)

(73) Assignee: Nexans (FR)

( * ) Notice: Subject to any disclaimer, the term of this patent is extended or adjusted under 35 U.S.C. 154(b) by 0 days.

(21) Appl. No.: 11/651,411

(22) Filed: Jan. 9, 2007

(51) Int. Cl.
*G02B 6/44* (2006.01)
(52) U.S. Cl. .................................. 385/109; 385/100
(58) Field of Classification Search ............. 385/100, 385/109
See application file for complete search history.

(56) References Cited

U.S. PATENT DOCUMENTS 4,972,581 A  11/1990  McCollum et al. .......... 30/90.1
6,236,789 B1 * 5/2001  Fitz ............................. 385/101
6,859,592 B2  2/2005  Seddon et al. .............. 385/111

\* cited by examiner

*Primary Examiner*—Jennifer Doan
(74) *Attorney, Agent, or Firm*—Sofer & Haroun, LLP

(57) ABSTRACT

An optical fiber cable includes a plurality of loose tubes, each of which contain at least one optical fiber therein. The loose tubes are constructed of a polymer with the tubes arranged in at least two layers, each of which are rotated in the same uni-helical direction and are ranged having substantially the same lay length. A jacket encases the loose tubes, where any one of the optical fibers in one of the loose tubes is accessible when the jacket is opened and the at least two layers are untwisted.

7 Claims, 6 Drawing Sheets

OPTICAL FIBER CABLE WITH SYSTEM AND METHOD FOR MID-SPAN ACCESS

FIELD OF THE INVENTION

The present invention relates to the field of optical fiber cables. More particularly, the present invention relates to the field of high fiber count optical fiber cables.

BACKGROUND OF THE INVENTION

High fiber count cables are employed for installations that require a large number of fiber optic connections such as data centers or other computer/data transfer intensive applications. In order to address this need, high fiber count optical fiber cables are produced having increased fiber counts, typically in the range of 216 through 432 fibers.

A typical high fiber count cable design includes an outer cable jacket, within which are multiple loose tube fiber cables arranged in layers around a central strength member. For example, a typical outer cable jacket may include eighteen loose tubes (one six tube layer and one twelve tube layer) to thirty six loose tubes (with an additional eighteen tube layer) therein. Within each loose tube fiber cable, another twelve UV coated optical fibers are loosely arranged. Loose tube fiber cables refer to an arrangement where the multiple individual optical fibers inside the loose tubes are substantially un-connected to the tube. Such an arrangement effectively bundles a large number of optical fibers into a relatively condensed outer jacket.

However, the current arrangement for such cables maintains significant drawbacks. Typically, there are two competing interests in the designs of such high fiber count optical fiber cables. The first concern is that users of such cables would like to have mid-span access to a fiber contained within one of the loose tubes within the larger high fiber cable. This is a desirable quality to allow for more complex installations where a particular fiber may need to be accessed mid-span of the larger cable, rather than at the end of the cable where the fibers are more easily accessed. But, because of the general high fiber count construction, mid-span access proves to be difficult.

For example, the lower (inner) layers of the loose tube cables are typically inaccessible due to the stranding of the internal elements. To access a lower layer, obviously a user would need to move the outer layers first. However, as with many cables having internal components, the internal components need to be stranded within the outer jacket for a number of reasons, such as allowing for easy spooling and un-spooling during installation and preventing vast length differentials between internal components when the larger cable is spooled or bent extensively during installation.

A typical stranding for such high fiber count optical fiber cables having a single layer is for a helical stranding arrangement such that all the internal components of that layer rotate helically in a single direction along the length of the cable. In larger high fiber count cables each of the layers are wound in opposite directions. However, as noted above, such a helical stranding makes it difficult and at times impossible to achieve mid-span access of many of the fibers within the lose tubes inside the cable. For example, with high fiber count optical fiber cables having multiple layers of loose tube optical fiber cables therein, mid-span access to fiber requires an un-twisting of the stranded cable, which is unworkable when there are multiple layers of loose tubes, each of different lay length and direction. Additionally, the problem of un-twisting is exacerbated because the loose tubes employ plastics having a high Young's modulus which are particularly stiff.

Prior art attempts to address this problem use an alternative S-Z stranding of the loose tubes within the cable, where the loose tubes reverse stranding direction periodically along the length of the cable. This allows easier mid-span access to the fibers because it is easier to unwind the tubes in the upper layers allowing the user to reach the fibers contained in the inner layers (center of the outer jacket). However, S-Z designs are less robust stranding designs that tend to unravel or un-rotate over time as a result of temperature expansion, and by excessive handling of the cable during installation/relocation. Use of S-Z may incorporate binders to hold the S-Z rotation, but such binders add yet another barrier to mid-span access of a fiber, add cost weight and additional stranding steps, and also results in undesirable crushing stresses on the fibers inside the tubes.

Another related drawback associated with the prior art in high fiber count optical fiber cables is that prior art cables typically use relatively high Young's modulus plastics for the loose tube construction. High Young's modulus plastics provide a greater level of protection to the fibers contained therein. However, in addition to being difficult to unwind for mid-span access due to their inherent stiffness, the use of such high modulus plastics exhibit higher temperature contraction reactions requiring, the tighter lay lengths in response. However, such designs, in addition to making it more difficult to achieve mid-span access in helical stranded cables because of the tighter winding that needs to be unwound, such high modulus plastics impart some inherent fiber bend stresses which is locked in during manufacture by the twisting of the tubes, and may be augmented by the use of water blocking gels that assist in locking in this strain. Such strain increases attenuation in the fibers and further hampers efforts for mid-span access.

OBJECTS AND SUMMARY

It is an object of the present invention to overcome the drawbacks associated with the prior art and to provide a high fiber count optical fiber cable that has both a stable and robust stranding, while simultaneously allowing for mid-span access of the individual fibers contained therein.

To this end the present invention is directed to an optical fiber cable that has a plurality of loose tubes, each of which contain at least one optical fiber. The loose tubes are constructed of a polymer having a low Young's constant modulus, such as a modulus resulting in a tensile strength substantially in the range of 2,500-2,800 PSI. The tubes are arranged in at least two layers, each of which are rotated in the same uni-helical direction, and where each of the at least two layers are arranged having substantially the same lay length. A jacket encases the loose tubes, such that a user, desiring access to any one of the optical fibers in one of the loose tubes, may open the jacket, untwist the at least two layers, access a desired loose tube and accompanying fiber contained therein and perform a desired splicing action.

BRIEF DESCRIPTION OF THE DRAWINGS

The present invention can be best understood through the following description and accompanying drawings, wherein.

DETAILED DESCRIPTION

Figure 1:
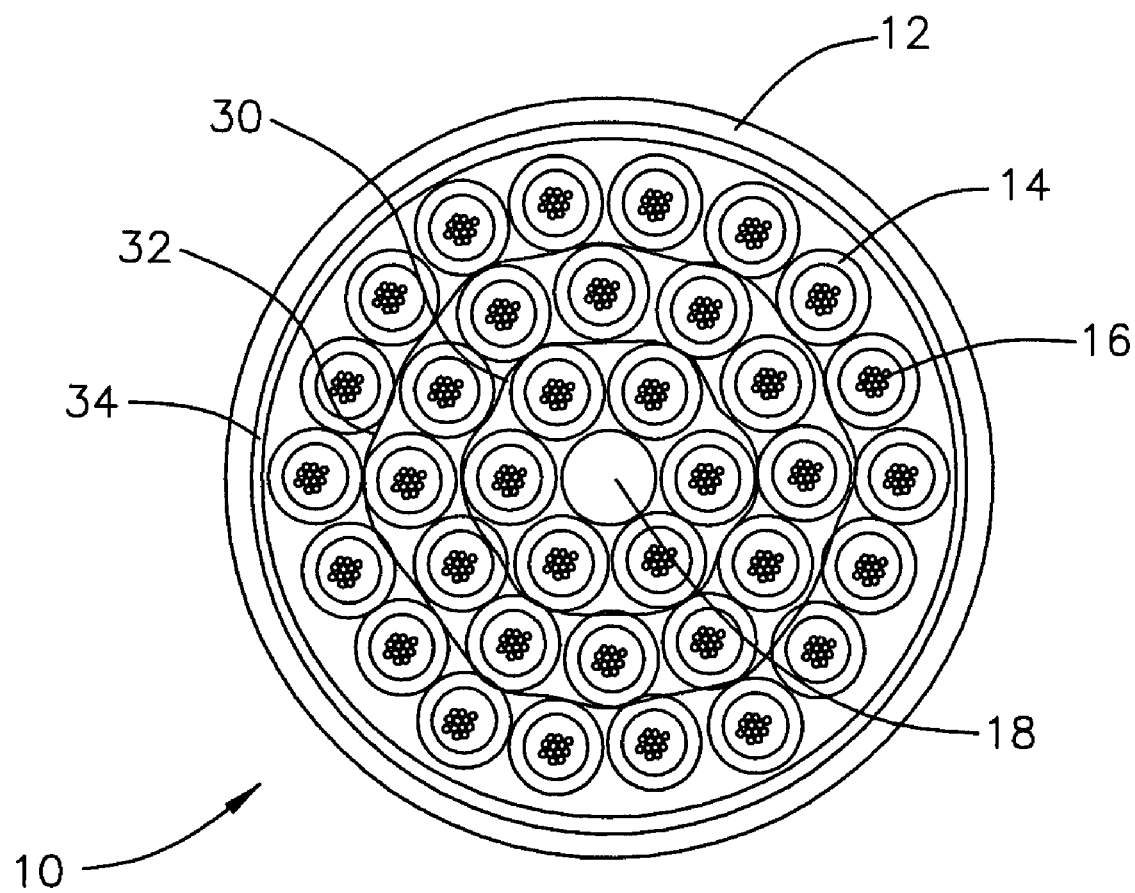
FIG. 1 illustrates a cross section of the high fiber count cable, in accordance with one embodiment of the present invention as claimed.

In one embodiment of the present invention, as illustrated in FIG. 1, a high fiber count optical fiber cable 10 is shown, having an outer jacket 12 and a number of loose tubes 14, each of which having a number of optical fibers 16 therein. A central strength member 18 is disposed centrally for added pulling and bending strength to cable 10.

Outer jacket 12 and loose tubes 14 are typically extruded polymers made from PVC compounds that exhibit Riser and Plenum rated fire resistance. A more detailed discussion of the composition of the polymers follows below. Optical fibers 16 may either be typical UV coated optical fibers (having a 250 micron diameter) or may be tight buffer (polymer coated) optical fibers (having a 900 micron diameter). For the purpose of illustration fibers 16 are discussed below as basic UV coated optical fibers 16.

Regarding the construction of loose tubes 14, each tube 14 is preferably an extruded polymer encasing twelve UV coated optical fibers 16. Twelve fibers 16 are used in typical arrangement, but more or less fibers may be used based on the desired overall fiber count of cable 10. Loose tubes 14 preferably are "dry" meaning they do not include any water blocking gels or other "wet" protective means. Loose tubes 14 preferably include a water absorbing powder 20 (not visible) such as an SAP (Super Absorbent Polymer). Such material is used to protect against moisture leakage into the tubes due to breaches in the outer jacket 12 or in tubes 14.

As illustrated in FIG. 1, loose tubes 14 are arranged in three overlapping layers 30, 32 and 34 around central strength member 18. It is understood that the general parameters for the process of applying the various layers of loose tubes 14 over strength member 18 is referred to by the common name of stranding, whereby pre-made rolls of the loose tubes 14, with fibers 16 therein, are pulled together in some twisted arrangement and whereby a jacket 12 is applied by extrusion over top. The manner of twisting loose tubes 14 or stranding is now discussed in more detail.

In one embodiment of the present invention, inner layer 30 maintains six loose tubes 14, intermediate layer 32 maintains twelve loose tubes 14 and outer layer 34 maintains eighteen loose tubes 14. Each tube 14 maintains twelve fibers totaling 432 fibers in cable 10. For the purposes of illustration, this thirty six loose tube 432 fiber 16 arrangement is used to illustrate the salient features of the present invention. However, other modified forms of cable 10, such as an eighteen tube 14 two layer arrangement (having 216 fibers) or other such high fiber count arrangements are also within the contemplation of the present invention. In the present example (of thirty six loose tubes 14) the approximate outer diameter of jacket 12 of cable 10 is preferably between 0.9" and 1.0" inches.

In another embodiment of the present invention loose tubes 14 of inner layer 30 are rotated in a uni-helical (single) direction around central strength member 18. The direction of rotation, clockwise or counterclockwise, is immaterial except that it continues in one direction without reversing on itself (which would be SZ stranding).

Figure 2:
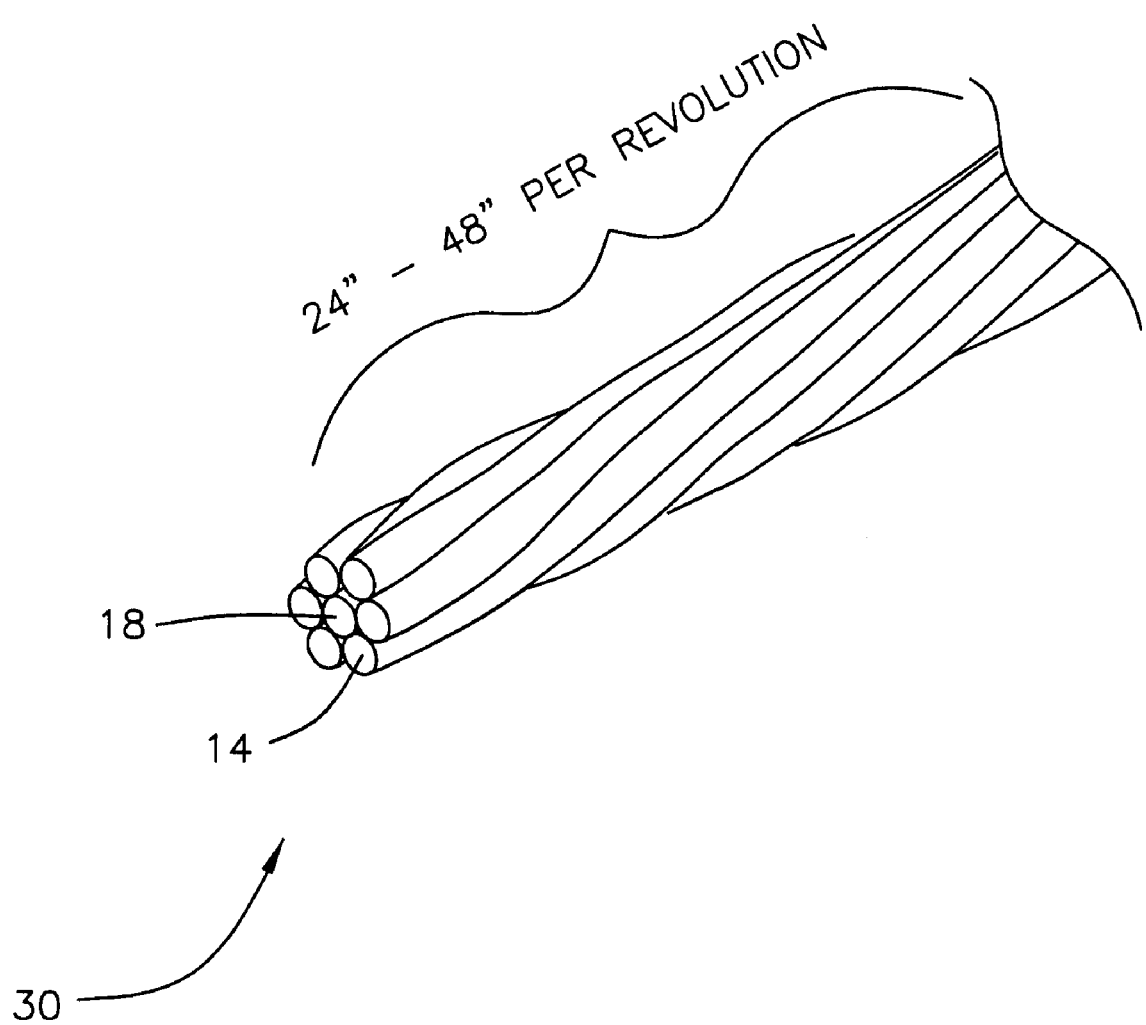
FIG. 2 illustrates an inner layer of loose tubes from the cable in FIG. 1, in accordance with one embodiment of the present invention.

As illustrated in FIG. 2, the lay length of loose tubes 14 in inner layer 30 is preferably in the range of 24-48 inches or longer, meaning the tubes 14 make one full helical revolution around strength member 18 for every 24-48 longitudinal inches of cable 10. Such lay lengths are much longer than typical prior art high fiber count optical fiber cables which is possible due to the low modulus plastics used as explained in more detail below. This makes mid-span access of an individual fiber 16 much easier than in prior art as explained in more detail below.

Figure 3:
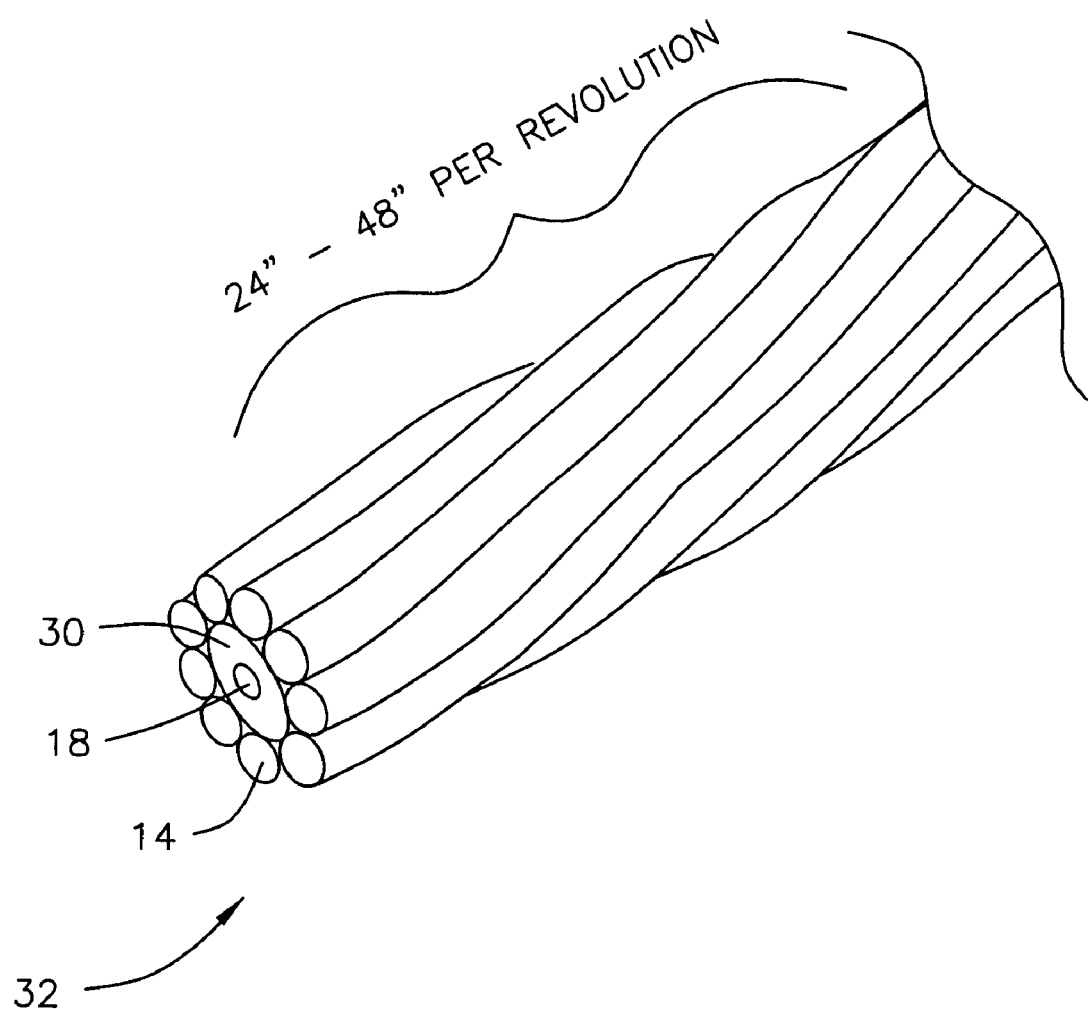
FIG. 3 illustrates an intermediate layer of loose tubes from the cable in FIG. 1, in accordance with one embodiment of the present invention.
Figure 4:
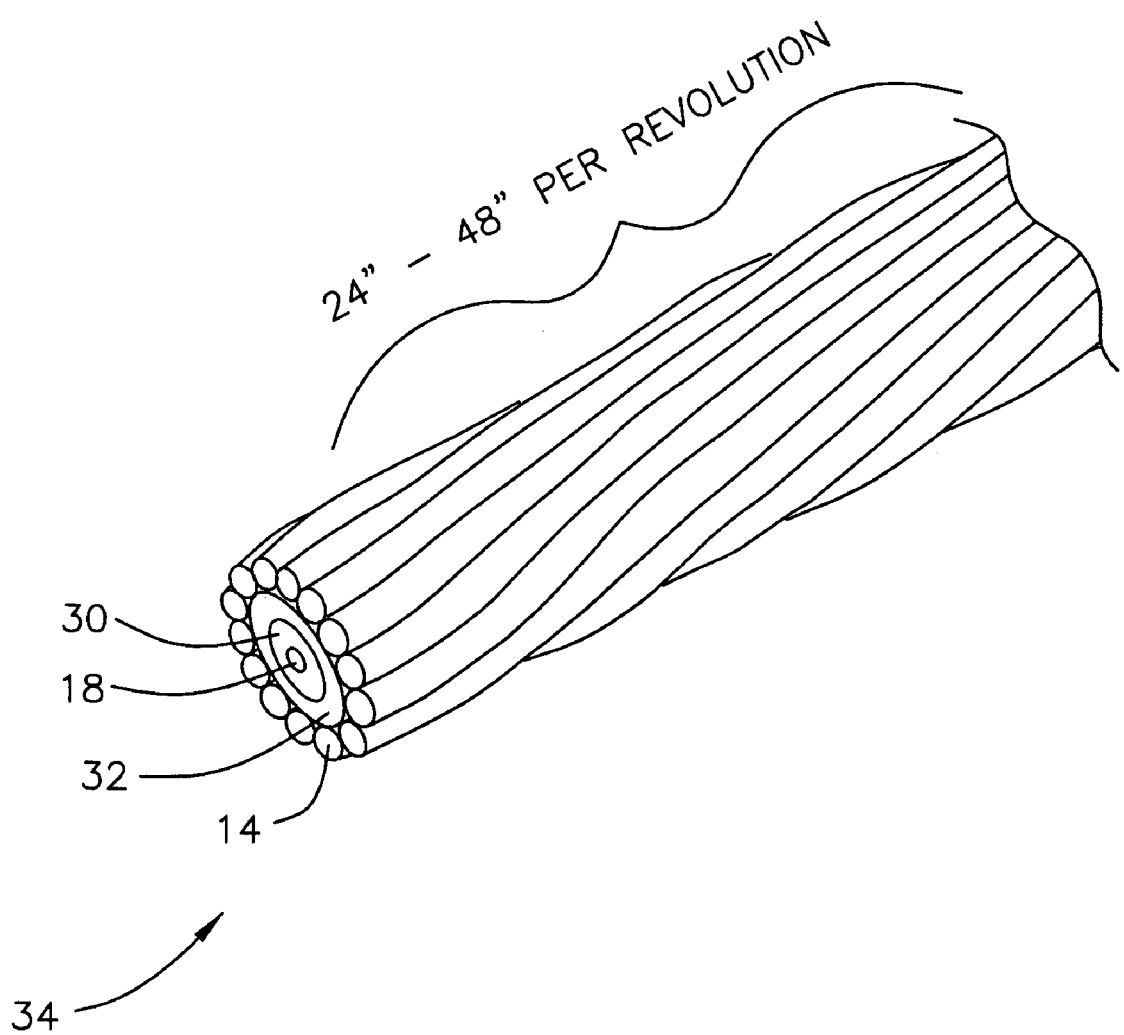
FIG. 4 illustrates an outer layer of loose tubes from the cable in FIG. 1, in accordance with one embodiment of the present invention.

As shown in FIG. 3, the lay length of loose tubes 14 in intermediate layer 32 is also preferably in the range of 24-48 inches. However, it is important to note that the lay length, whether 24 through 48 inches, is the same as the lay length used in inner layer 30. Likewise, outer layer 34 having the remaining eighteen loose tubes 14 as shown in FIG. 4, also maintains a lay length of 24-48 inches, being the same as the lay lengths for both inner layer 30 and intermediate layer 34.

Another advantage of the long lay lengths used for tubes 14 is that these lay lengths put less torsional forces in the polymer materials used for tubes 14, making them less susceptible to fracture at very cold temperatures. Furthermore, the arrangement of layers 30, 32 and 34, each having the same uni-helical lay direction and substantially the same lay length, allows for a more even distribution of compression forces on cable 10, rendering less point forces on tubes 14 making them less susceptible to fracture at very low temperatures.

Thus, by the above described arrangement, all of the loose tubes 14 in cable 10, in each of layers 30, 32 and 34 are all of the same long lay length and in the same uni-helical twisted direction, which allows for mid-span access of a fiber 16 not previously available in uni-helical high fiber count cable design as discussed in more detail below. It is noted that there are additional added benefits for using the long lay lengths for tubes 14 in that it reduces fiber strain locked into fibers 16 in the tightly twisted loose tubes of the prior art, thus reducing attenuation caused by excessive fiber bending.

In one embodiment of the present invention, loose tubes 14 are preferably constructed from a polymer having a low Young's constant modulus. An exemplary polymer having a low Young's constant are polymers sold under the trade name Georgia Gulf™ 16882 or Alpha Gary™ 1076. Such polymers having these low Young's constants have correspondingly low expansion coefficients, thus allowing the long lay lengths for loose tubes 14 (not tightly twisted) that cannot be used in high Young's modulus loose tubes of the prior art.

Typically, the polymer employed has a Young's modulus that results in a tensile strength of 2500-2800 PSI exhibiting a coefficient of thermal expansion of $3 \times 10^5$-$5 \times 10^5$ per degree C.° as opposed to prior art which typically employs polymers having a Young's modulus that results in a tensile strength 4,000-10,000 PSI.

Such a lower modulus of the polymer used in tubes 14, increases their ability to remain flexible at colder temperatures. The modulus of tubes 14 are at the minimum acceptable level of modulus in terms of crush or compression.

Thus, the combination of the use of the absorbent powder 20 filled and low modulus plastics for tubes 14 and the stranding of layers 30, 32 and 34 in a uni-helical design allow for mid-span access to a particular fiber 16, in any one of tubes 14, at any point along cable 10. This combination is able to overcome the drawbacks of the prior art necessary to compensate for the contraction/expansion of the high modulus plastics, namely that the high modulus plastics were difficult to unravel for mid-span access because the plastic was too rigid, and because the helical winding was too tight. Such an arrangement of the present invention, allowing for mid-span access in uni-helical designs further allows for lighter designs due to the longer lay lengths, also reducing material consumption making cable 10 lighter, less expensive, and containing less fuel in the case of a fire (hence better fire safety ratings).

An additional advantage of the combination of the low modulus plastics and the matching uni-helical layers 30, 32 and 34, is that by keeping the lay lengths at each layer 30, 32 and 34 substantially identical, tubes 14 nest between or in parallel to the grooves between tubes 14 from the prior layers, providing for a more even distribution or contact support during compression. Thus, more evenly distributing the compression forces effectively increasing the effective compression resistance of the stranded group, allowing for acceptable levels of crush resistance even with low modulus plastics for tubes 14. This is in contrast to the prior art that uses SZ stranding or contra-helical stranding arrangements, that render a cross pattern and "points" for compression failure. Furthermore, the binders required by SZ stranding may render compression points itself if the binder is too tight.

Yet another advantage of this nesting affect of the layers being uni-helical, in the same direction and having the same lay length is that the more even distribution of crush forces allows for additional options to employ thinner walled tubes 14 (regardless of modulus), ultimately reducing the amount of necessary plastic in cable 10, improving overall packing density of fibers 16. This arrangement reduces excess materials in the manufacture of cable 10.

Figure 5:
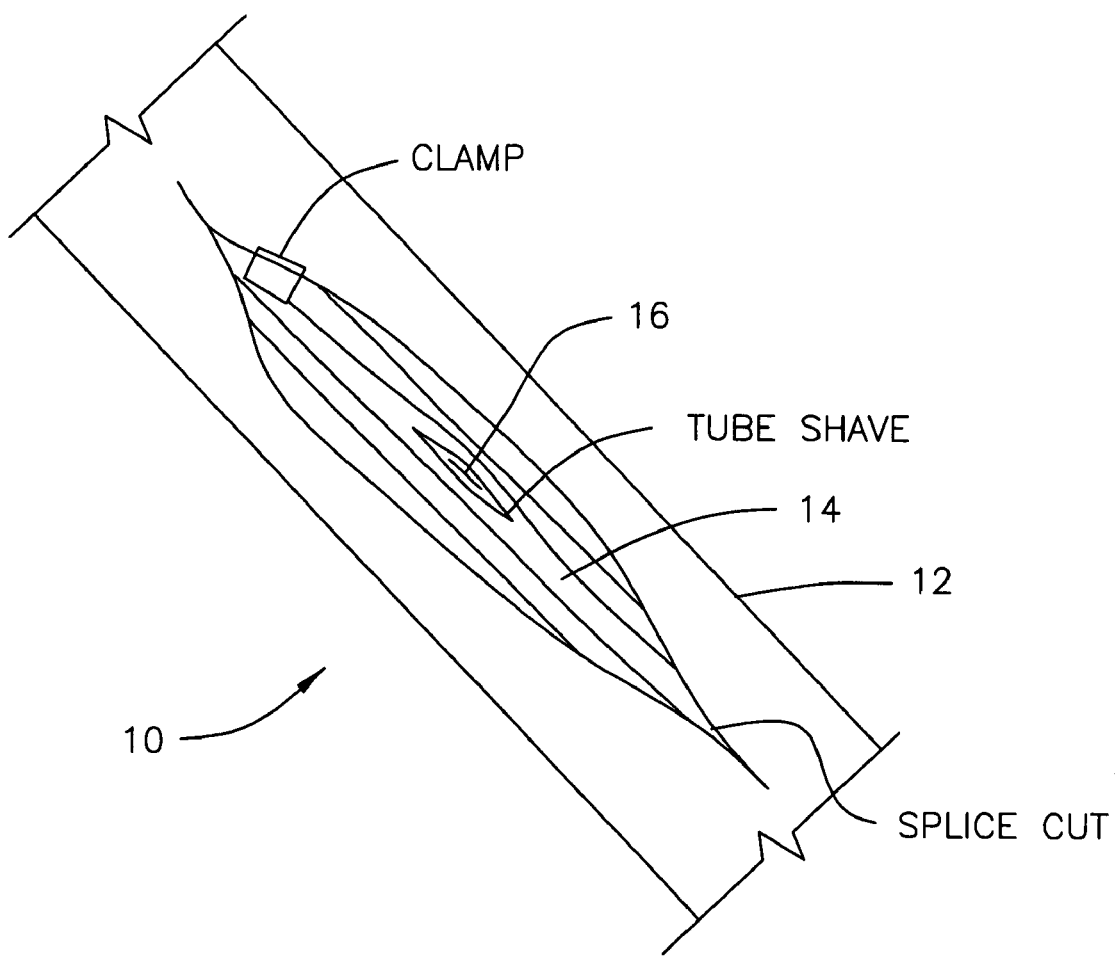
FIG. 5 illustrates a sample of a mid-span access to the cable of FIG. 1, in accordance with one embodiment of the present invention.

In accordance with one embodiment of the present invention, as illustrated in FIG. 5, in order to achieve mid-span access to a desired fiber 16, a cut of approximately 2-8 feet is made in outer jacket 12 of cable 10. The user is then able to clamp cable 10 (or the core of tubes 14) on one end and un-twist tubes 14 until they are straight. It is understood that the method of removing and/or opening jacket 12 (cutting, shaving etc. . . . ) is immaterial so long as tubes 14 may be accessed for at least a desired length.

Figure 6A:
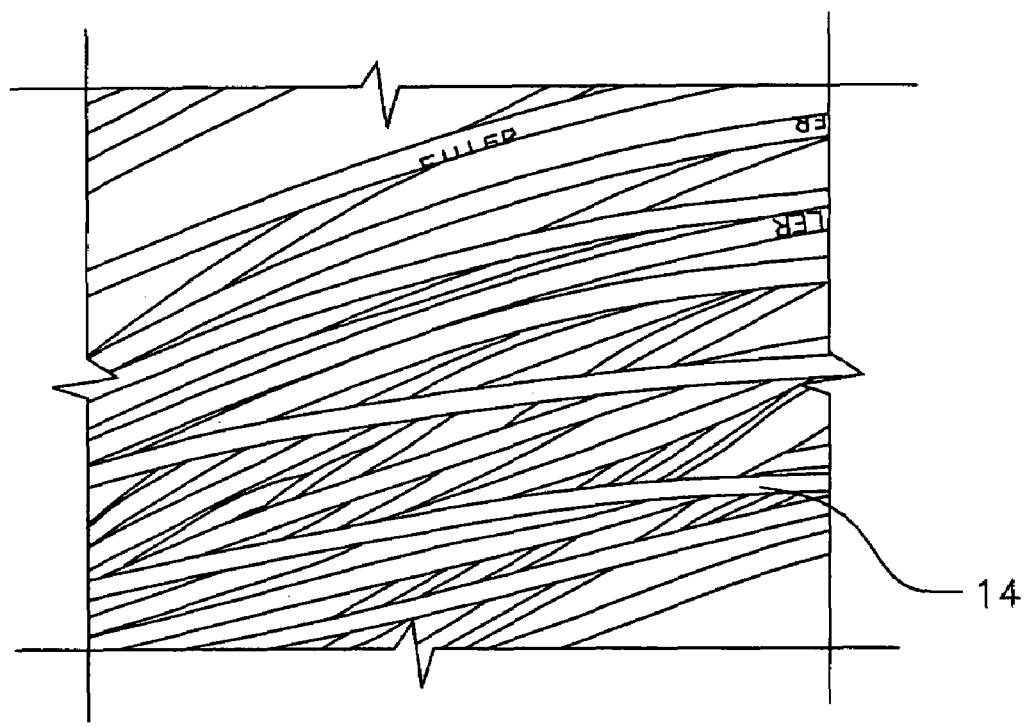
FIGS. 6A and 6B illustrates a sample of the un-twisted tubes from the mid-span access shown in FIG. 5, in accordance with one embodiment of the present invention.
Figure 6B:
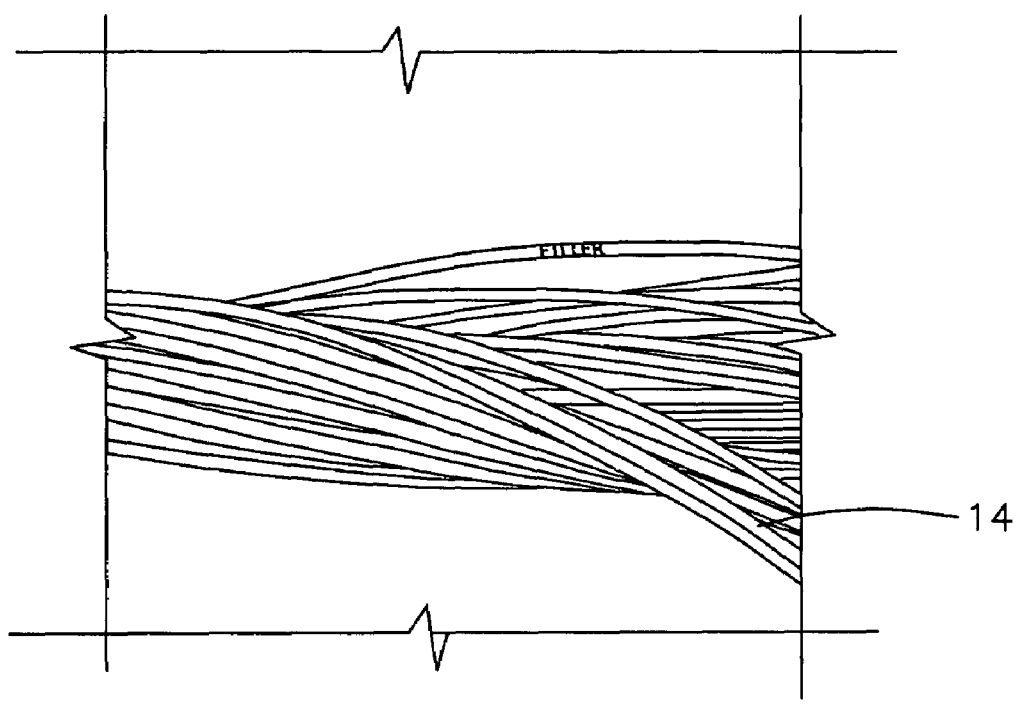

For example, if layers 30, 32 and 34 are all twisted at a clockwise helix of 36 inch lay length and the cut in the cable is 6 feet, then the user simply grabs the entire tube 14 core of layers 30, 32 and 34 and rotates them counter-clockwise in two full turns (access length 6 feet/lay length of 36 inches=2). This untwisting, previously not possible in multi-layer uni-helical high modulus fiber cables is facilitated in the present invention because the low modulus plastic used in tubes 14 of the present invention are less resistant to manual rotation after stranding and the longer lay lengths require significantly less twists per access length. FIGS. 6A and 6B illustrate exemplary tubes 14 removed from the cut in outer jacket 12 and in an un-wound state. FIG. 6B is the initial unwinding and FIG. 6A shows a complete unwound state where all fiber tubes 14 from each of layers 30, 32 and 34 are accessible.

Once tubes 14 are untwisted, a second end of the cable 10 is closed, and the appropriate tube 14 is selected and tube 14 exterior is shaved to expose fibers 16. This fiber 16 may then be spliced as desired. After the splice when the clamps are removed tube 14, from which fiber 16 was accessed may either be re-threaded back into the stranded tubes 14 or left in an outer layer 34 or outside of jacket 12 depending on the user's future intentions. The entire opened jacket 12 assembly can be covered with a heat shrinking tubing to re-seal the cut or shaved portion.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. An optical fiber cable, said cable comprising:
   a plurality of loose tubes, each of which containing at least one optical fiber therein, said loose tubes constructed of a polymer;
   said tubes arranged in at least three layers, each of said layers being rotated in the same uni-helical direction, and wherein each of said at least three layers are arranged having substantially the same lay length, such that the arrangement results in a nested assembly where said loose tubes rest in, or are parallel to, grooves formed by said loose tubes in a below disposed layer; and
   a jacket encasing said loose tubes, wherein any one of said optical fibers in one of said loose tubes is accessible when said jacket is opened and said at least two layers are untwisted.

2. The cable as claimed in claim 1, wherein the lay length in each of said layers is substantially in the range of 24-48 inches.

3. The cable as claimed in 1, wherein said cable maintains an outer jacket diameter of substantially 0.9" to 1.0".

4. The cable as claimed in claim 1, wherein said optical fibers are UV coated optical fibers having an outer diameter of substantially 250 microns.

5. The cable as claimed in claim 1, wherein said loose tubes further contain a water absorbing powder.

6. The cable as claimed in claim 1, wherein said polymer used for said loose tubes maintains a tensile strength substantially in the range of 2,500-2,800 PSI.

7. The cable as claimed in claim 1, wherein said polymer used for said loose tubes maintain a coefficient of thermal expansion substantially in the range of $3 \times 10^5$-$5 \times 10^5$ per degree C.°.

* * * * *